(12) United States Patent
Drouot

(10) Patent No.: US 9,042,676 B2
(45) Date of Patent: May 26, 2015

(54) METHOD AND DEVICE FOR FORMING A PANORAMIC IMAGE

(75) Inventor: Antoine Drouot, Paris (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 116 days.

(21) Appl. No.: 13/876,694

(22) PCT Filed: Sep. 30, 2011

(86) PCT No.: PCT/EP2011/067094
§ 371 (c)(1),
(2), (4) Date: May 21, 2013

(87) PCT Pub. No.: WO2012/042011
PCT Pub. Date: Apr. 5, 2012

(65) Prior Publication Data
US 2013/0236122 A1 Sep. 12, 2013

Related U.S. Application Data

(60) Provisional application No. 61/406,787, filed on Oct. 26, 2010.

(30) Foreign Application Priority Data

Sep. 30, 2010 (EP) .................................. 10306066

(51) Int. Cl.
G06K 9/36 (2006.01)
G03B 37/04 (2006.01)
G06T 3/40 (2006.01)

(52) U.S. Cl.
CPC ........ *G06K 9/36* (2013.01); *G03B 37/04* (2013.01); *G06T 3/4038* (2013.01)

(58) Field of Classification Search
None
See application file for complete search history.

(56) References Cited

U.S. PATENT DOCUMENTS

| 6,038,348 | A | * | 3/2000 | Carley | 382/268 |
| 6,173,087 | B1 | * | 1/2001 | Kumar et al. | 382/284 |
| 6,393,163 | B1 | * | 5/2002 | Burt et al. | 382/294 |
| 6,999,630 | B1 | * | 2/2006 | Drouot | 382/262 |
| 7,006,706 | B2 | * | 2/2006 | Sobel et al. | 382/284 |
| 2003/0194149 | A1 | | 10/2003 | Sobel et al. | |
| 2009/0153647 | A1 | * | 6/2009 | Auberger | 348/36 |
| 2010/0097444 | A1 | * | 4/2010 | Lablans | 348/46 |
| 2014/0022338 | A1 | * | 1/2014 | Auberger et al. | 348/36 |

FOREIGN PATENT DOCUMENTS

WO 2007122584 A1 11/2007

OTHER PUBLICATIONS

Irani, M.; Anandan, P.; Hsu, S., "Mosaic based representations of video sequences and their applications," Computer Vision, 1995. Proceedings., Fifth International Conference on , vol., No., pp. 605,611, Jun. 20-23, 1995.*

(Continued)

*Primary Examiner* — Andrae S Allison
(74) *Attorney, Agent, or Firm* — Patent Portfolio Builders PLLC

(57) ABSTRACT

There is described a method and a device for forming a panoramic image wherein it is decided to add a current image in a current panoramic image based on definitions of edges of the current image and the current panoramic image.

18 Claims, 4 Drawing Sheets

(56) References Cited

OTHER PUBLICATIONS

International Search Report issue in corresponding International application No. PCT/EP2011/067094, mailing date Dec. 14, 2011.

Written Opinion of the International Searching Authority issued in corresponding International application No. PCT/EP2011/067094, mailing date Dec. 14, 2011.

* cited by examiner

METHOD AND DEVICE FOR FORMING A PANORAMIC IMAGE

TECHNICAL FIELD

The present invention generally relates to methods and apparatuses for forming panoramic images.

BACKGROUND

Panoramic images are larger images formed by assembling smaller still or video images according to a single given direction (e.g. left to right) imposed by the movement of the camera that captured the sequence of images.

US 2003/194149 discloses a method for incorporating small images into a mosaic image.

Typically, a current image is superimposed on the preceding image in the sequence. Hence, a first area of the current image typically corresponds to a common part between the current and one or more of the preceding images. Also, a second area of the current image corresponds to a part of the current image that is not common with any of the preceding images and will complete the preceding image for forming the panoramic image.

The definition of the first and second areas thus comprises dividing the current image into two parts (the area being the left part and the second area being the right part, in case of a left to right movement of the camera).

The superimposition of the current image on the preceding image is performed by analysis of all the pixels of each image, or by analysis of the movement of the camera.

Once the current image has been superimposed on the preceding image, the pixels of the current image in the first area are typically mixed or blended with the pixels of the preceding image in the first area, and the second area is added to the preceding image to complete the panoramic image comprising the previous image.

The comparison of the images in order to define the above described areas necessitates a lot of processing, especially with high quality images of several megapixels.

Also, the forming of panoramic images is limited to a one direction movement of the camera because of the definition of the areas by dividing the current image into two parts.

Further, if a subsequent image (following the current image) is to be inserted in the panoramic image and if that subsequent image has a part overlapping with the previous common parts of the current and preceding images, then, another mixing of pixels of this common part with pixels of the overlapping part of the subsequent image is performed and decreases quality of the panoramic image.

These are some drawbacks that may be addressed.

SUMMARY

A first aspect of the invention relates to a method of forming a panoramic image by assembling images according to at least two non parallel directions, the method being performed by an image processing device, and the method comprising the following steps of:

storing first coordinates defining in a two dimensional space, edges of a current panoramic image, superimposing a current image on said current panoramic image for completing the current panoramic image, the current image thus having at least a first area which is not common with the current panoramic area, storing second coordinates defining in the two dimensional space, edges of the current image superimposed on the current panoramic image, deciding whether the first area should be added to the current panoramic image, based on the first and second stored coordinates, adding, at least partially, the first area of the current image to the current panoramic image, if it has been decided to add the first area.

Embodiments of the invention are recited in the dependent claims attached hereto.

A second aspect of the present invention relates to a computer program product comprising a computer readable medium, having thereon a computer program comprising program instructions adapted to, when loaded and run on computer means of an image processing device, cause the computer means to implement the steps of a method according to the first aspect.

A third aspect of the invention relates to a circuit configured for implementing a method according to the first aspect.

A fourth aspect of the present invention relates to a device comprising a circuit according to the third aspect.

A fifth aspect of the present invention relates to an image capturing device, such as a camera or a mobile telephone, comprising an image capturing arrangement and an image processing device according to the fourth aspect.

Some advantages of some embodiments of the invention are as follows.

It is possible to assemble images in two non parallel directions and thus generating a two dimensions panorama.

The amount of data to process is reduced since only information relating to the edges of the current panoramic image and the current image is used. Thus, the amount of memory needed in the image processing device is also reduced.

The decision as to whether to incorporate an image to the panoramic image is facilitated, since the amount of data to process is reduced and the occupation of the calculation means is reduced. The forming of the panoramic image is thus accelerated.

In addition, useless blending of pixels is avoided notably because images that do not provide information may be easily and rapidly discarded. Also, when incorporation of data is decided, only relevant parts of it may be added to the panoramic image.

BRIEF DESCRIPTION OF THE DRAWINGS

The present invention is illustrated by way of example, and not by way of limitation, in the figures of the accompanying drawings, in which like reference numerals refer to similar elements and in which.

DESCRIPTION OF PREFERRED EMBODIMENTS

Figure 1:
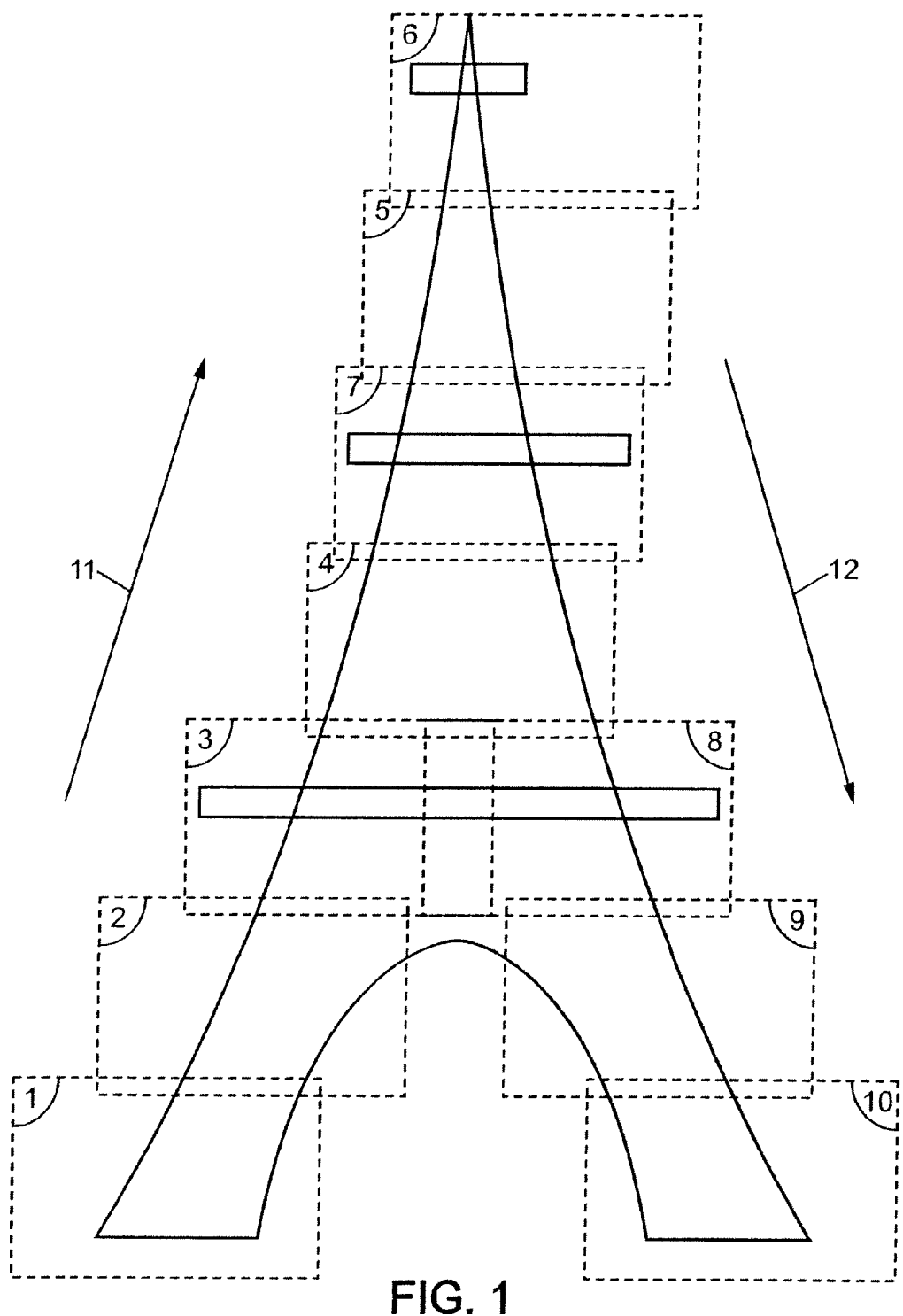
FIG. 1 is a schematic illustration of images captured for being assembled as a panoramic image according to some embodiments of the invention.

FIG. 1 shows a series of images that have been captured by a camera. The images may be still images that have been successively captured or images that originate from a video sequence.

The images have been taken to show the Eiffel Tower from the bottom to the top. Since during the movement of the camera, the field of view of the camera cannot capture an image that shows the base of the Eiffel tower in its entirety, the camera has to make a first movement from the bottom to the top (as shown by arrow 11) and take images 1, 2, 3, 4, 5, 6, and then make another movement from the top to the bottom that slightly deviates from the left to the right (shown by arrow 12), and take images 7, 8, 9, and 10.

Hence, the set of images 1-10 represents a complete panorama of the Eiffel Tower.

According to other embodiments, the images may be taken in any direction; the camera may have any movement (left-right, right-left, top-down, bottom-up, passing several times on a same view, coming back to a same view etc.).

Figure 2:
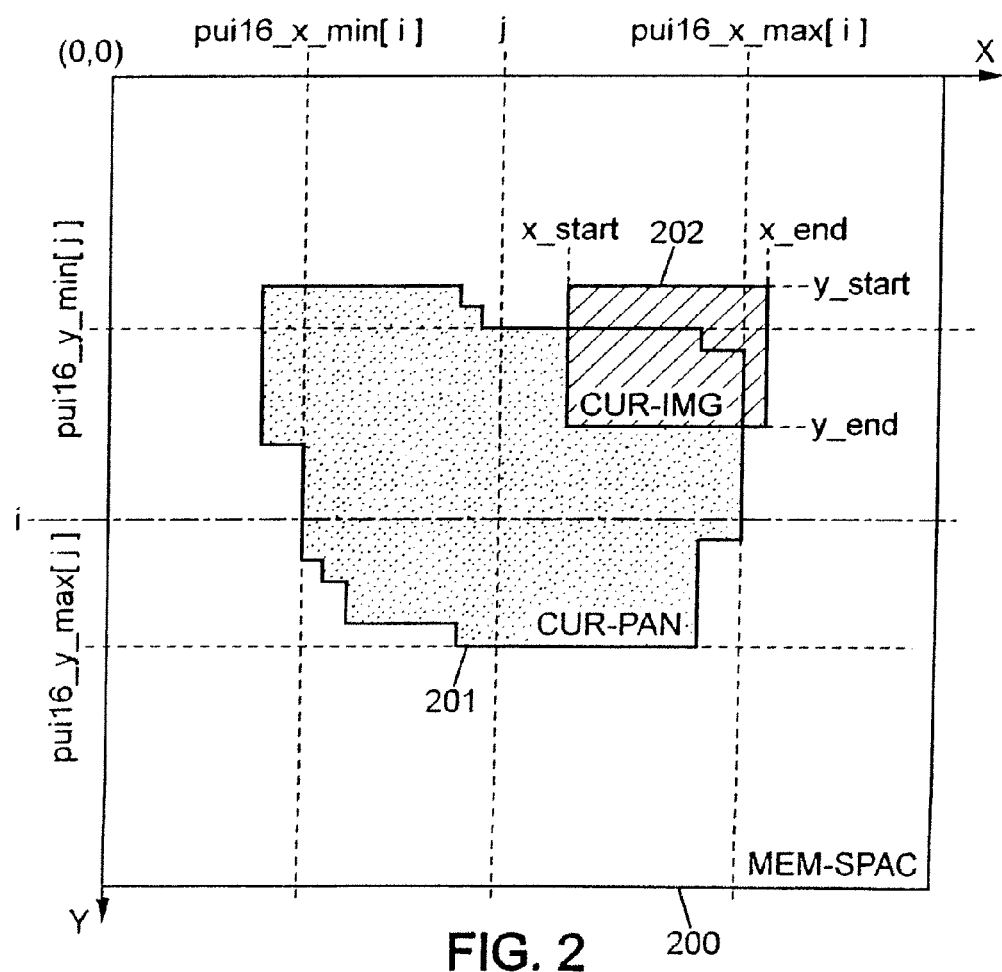
FIG. 2 is a schematic illustration of the forming of a panoramic image according to some embodiments of the invention.

FIG. 2 illustrates the forming of a panoramic image according to an embodiment.

A panoramic space 200 is defined for storing the panoramic image. The panoramic space may have the size and the shape that is contemplated for the final panoramic image. In the present embodiment, the panoramic space has a rectangular shape.

The panoramic space is a common base to all mosaicing algorithms. For instance, in US 2003/194149, such space is named a "mosaic image" (but in this document it is not two dimensional).

Another way to understand it may be as a memory space where the mosaic data and pixels of the images are stored. It enables to propose a common coordinate system in which the motion of the input frames is to be computed.

The panoramic space may be a two dimensional virtual working space. It defines a coordinate system enabling to position different images and pictures. In particular, the working space enables to displace pictures with regard to each other. Its dimensions may be estimated beforehand. Alternatively its dimensions may evolve as additional images are created or inserted.

In one embodiment, the first picture defines the panoramic space, which evolves as new images are added.

A two dimensional coordinates system (X, Y) is associated to the panoramic space and to the images that are stored in the panoramic space. Each point of the mosaic space has an abscissa j, and an ordinate i. In this example embodiment, the origin of the panoramic space is placed in the top left corner of the panoramic space. Each pixel of the panoramic space is associated to a couple of coordinates (x,y). For example, the coordinates system is orthonormal.

The panoramic space comprises a current panoramic image 201 that results from the aggregation of several previous images or to the first image when the forming of the panoramic image has just been initiated.

When a new image 202 is captured, it is superimposed on the current panoramic image 201. For example, it is superimposed on the current panoramic image based on an analysis of the movement of the camera which captured the images, or based on an analysis of the content of the current image 202 and the current panoramic image 201.

As illustrated on FIG. 2, the current panoramic image may have any shape, and the current image may be superimposed on the current panoramic image at any position in the coordinate system. In the Example of FIG. 2, the current panoramic image has a convex shape.

According to this embodiment, the panoramic image is not limited to a linear panoramic view, but may result from any movement of the camera.

The image processing device according to the embodiment stores a definition of the edges of the current panoramic image 201, and a definition of the edges of the current image when already superimposed on the current panoramic image.

In the embodiment, the edges are defined according to the directions of the X axis and the Y axis.

For each abscissa j of the coordinates system, the image processing device stores the value pui16_y_min[j] which represents the least ordinate of the current panoramic image at abscissa i, and the value pui16_y_max[j] which represents the greatest ordinate of the current panoramic image at abscissa j.

For storing these values, vectors pui16_y_min and pui16_y_max are defined. These vectors have the same size as the panoramic space length in the Y direction. In order to store vectors of a lower size, only the values for abscissas of the current panoramic image may be stored.

For each ordinate i of the coordinates system, the image processing device stores the value pui16_x_min[i] which represents the least abscissa of the current panoramic image at ordinate i, and the value pui16_x_max[i] which represents the greatest abscissa of the current panoramic image at ordinate i.

For storing these values, vectors pui16_x_min and pui16_x_max are defined. These vectors have the same size as the panoramic space length in the X direction. In order to store vectors of a lower size, only the values for ordinates of the current panoramic image may be stored.

For defining the edges of the current image 202, the image processing device stores the following values:

x_start representing the least abscissa of the current image, y_start representing the least ordinate of the current image, x_end representing the greatest abscissa of the current image, and y_end representing the greatest ordinate of the current image.

These values may be defined for several abscissas and ordinates of the current image. However, due to the rectangular shape of the current image and the fact that the edges of the current image are parallel to the axes of the coordinate system, the four values described above may suffice to define the current image.

In order to determine whether the current image 202 brings enough information to the current mosaic image, two margin values hor_margin and ver_margin are defined. The margin value hor_margin is used for deciding whether the current image provides enough information in the X direction to the current panoramic image for being integrated to it. The margin value ver_margin is used for deciding whether the current image provides enough information in the Y direction to the current panoramic image for being integrated to it.

For example, hor_margin=image_width/32 and ver_margin=image_height/32, image_width representing the length of the current image (in pixels) according to the X axis, and image_height represents the length of the image (in pixels) according to the Y axis.

The following equations define conditions for a current image to be considered for integration in the current panoramic image:

$$x\_start + hor\_margin < pui16\_x\_min[i] \quad (eq1),$$

$$pui16\_x\_max[i] + hor\_margin < x\_end \quad (eq2),$$

$$y\_start + ver\_margin < pui16\_y\_min[j] \quad (eq3), \text{ and}$$

$$pui16\_y\_max[j] + ver\_margin < y\_end, \quad (eq4).$$

If at least one of the preceding equations is satisfied for at least one abscissa and/or ordinate, the current image is selected for integration in the current panoramic image.

In the present embodiment, a maximum of only 2× (image_width+image_height) comparisons are to be performed, which is less than the image_width×image_height comparisons to perform when comparing the current image and the current panoramic image according to techniques of the prior art.

Thus this comparison is done in a very efficient way, with at least one order of complexity less than a straightforward method, wherein would be to compare all pixels coordinates.

Figure 3:
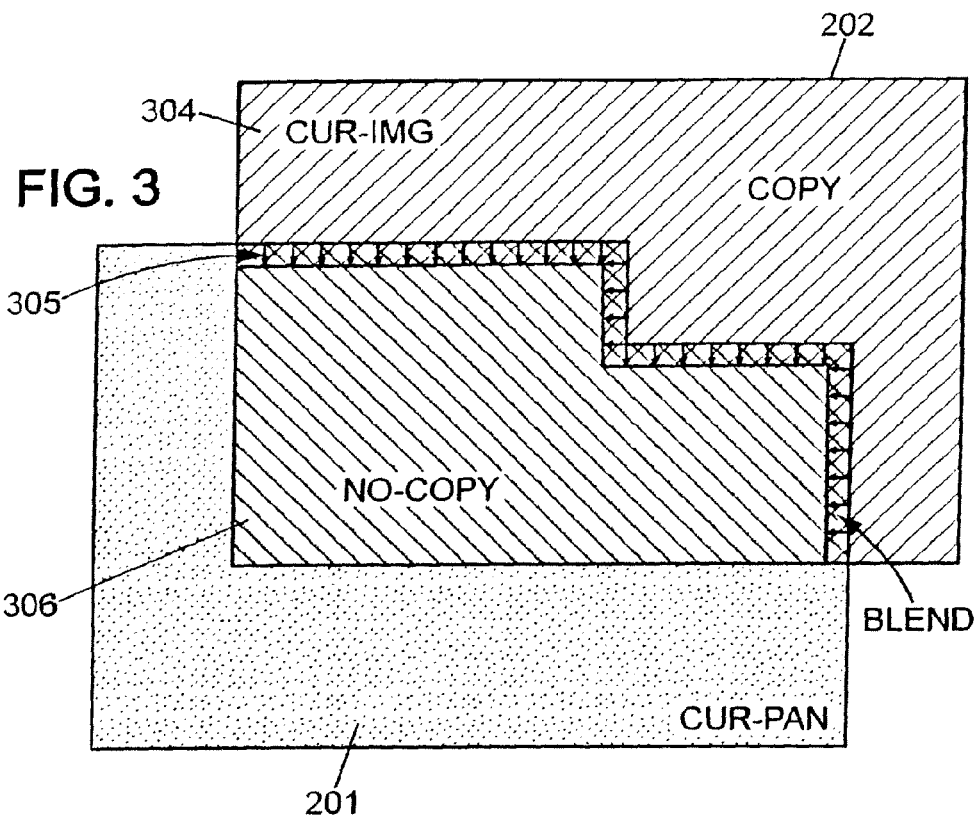
FIG. 3 is a schematic illustration of the addition of a current image to a current panoramic image according to some embodiments of the invention.

The integration of the current image according to some embodiments of the invention is described with reference to FIG. 3.

Three areas are defined in the current image 202.

A first area (or zone) 304 corresponds to an area that is not overlapping with the current panoramic image. A second area 306 corresponds to an area that is overlapping with the current panoramic image. A third area 305 corresponds to an area included in the second area that is adjacent to the first area 304 and that extends along the line of separation of areas 304 and 306.

According to the present embodiment, when current image 202 has been selected for integration in the current panoramic image:
  the pixels of area 304 are copied in the panoramic space at the location where they have been superimposed, thus completing the current image,
  the pixels of the area 305 are blended with the pixels of the current panoramic image, thus smoothing the addition of the current image to the current panoramic image, and
  the pixels of the area 306 that are not part of the area 305 are discarded because they do not bring information to the current panoramic image.

The set consisting of the pixels of area 304, and the pixels of the current panoramic image including those that have been blended with the pixels of area 305, constitutes the new current panoramic image. The vectors pui16_x_min, pui16_x_max, pui16_y_min, and pui16_y_max are then updated. The update may consist in modifying values of the greatest/lowest abscissas/ordinates or adding new values when the current panoramic image has been extended.

The update process is made simple in the present embodiment since less data are to be processed.

If a new image is considered for integration in the panoramic image, the same process as the one disclosed here above is performed.

Figure 4:
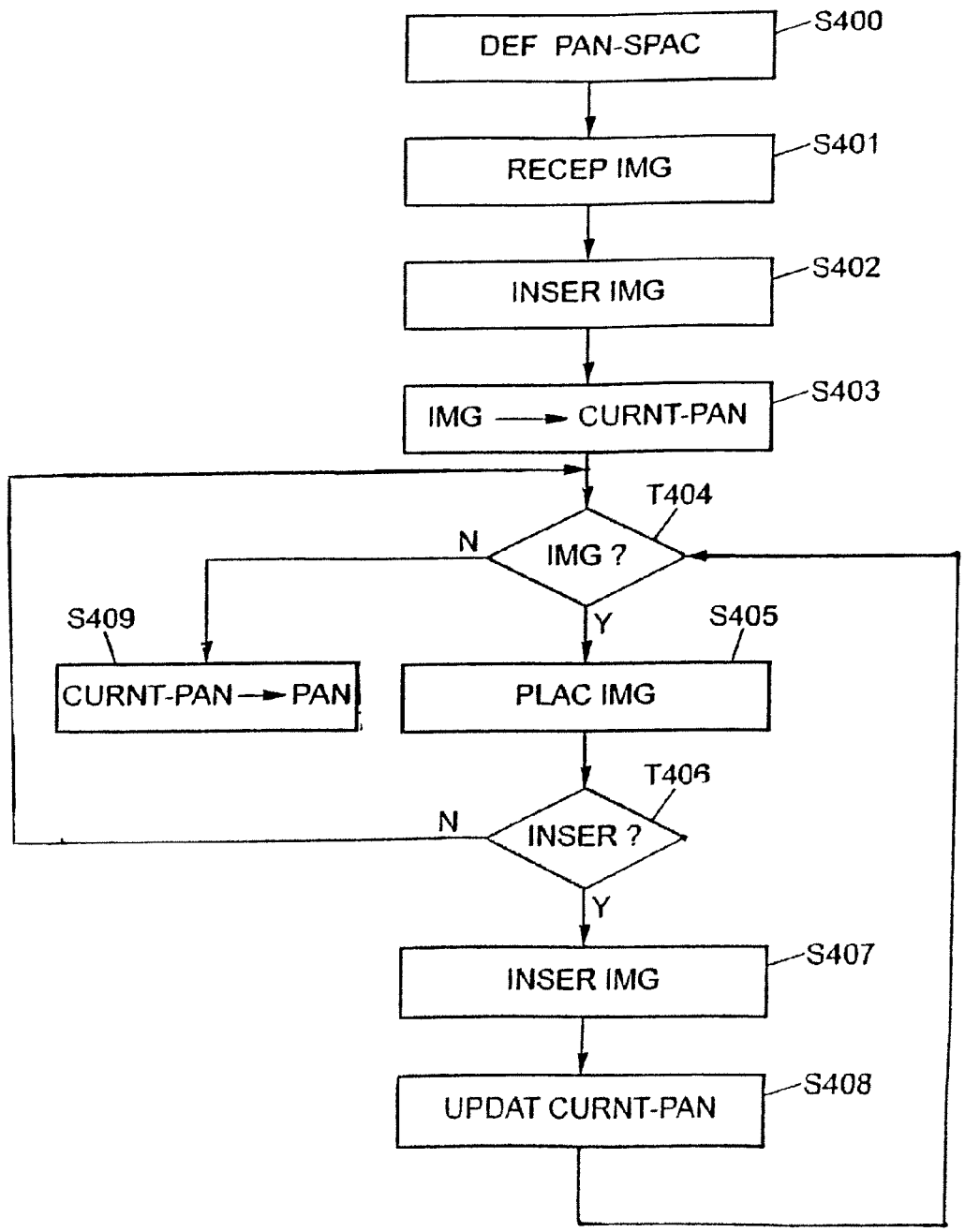
FIG. 4 is a flowchart of steps performed according to according to some embodiments of the invention.

FIG. 4 is a flowchart illustrating steps of a method performed according to an embodiment.

In step S400, a panoramic space is created by allocating a dedicated memory space. The panoramic space may be defined according a size of the contemplated panoramic image, so that the panoramic image can be stored therein.

In step S401, a first image is received for commencing the process of formation of the panoramic space.

The first image is inserted in the panoramic space in step S402. No assumption is made on the position of the first image in the final panoramic image. Hence, for example, the first image is positioned at the centre of the panoramic space.

Then, in step S403, the first image is stored in the panoramic space as the current panoramic image, and vectors defining the edges of the current panoramic image are created and stored.

In step T404, it is determined whether there are incoming images for insertion (addition) in the panoramic space for completing the current panoramic image.

When a new current image is received, it is placed during step S405 in the panoramic space by superimposition on the current panoramic image so as to complete the current panoramic image. The superimposition of the current image on the current panoramic image may be performed according to several techniques, such as a motion analysis of the field of view of the camera that captured the images or other techniques. The edges of the current image are then defined and stored.

Then, in step T406, it is decided whether the current image should be inserted in the panoramic image or not. It is decided whether the current image brings enough information the current panoramic image, based on the coordinates of the edges of the current panoramic image and the coordinates of the edges of the current image as described in details above, for example using equations eq1, eq2, eq3, and eq4.

If it is decided that the current image does not bring enough information, the current image is discarded and the process turns back to step T404.

If it is decided that the current image brings enough information, the insertion of the non overlapping part of the current image with the current panoramic image is performed during step S407. The blending process presented above may also be performed.

After that, during step S408, the vectors defining the edges of the current panoramic image are updated for taking into account the part of the current image that has been added.

Then, the process turns back to step T404 for verifying whether there are other images to add.

If no other image is to be inserted, the process goes to a termination step S409 during which the current panoramic image is stored as the final panoramic image.

Figure 5:
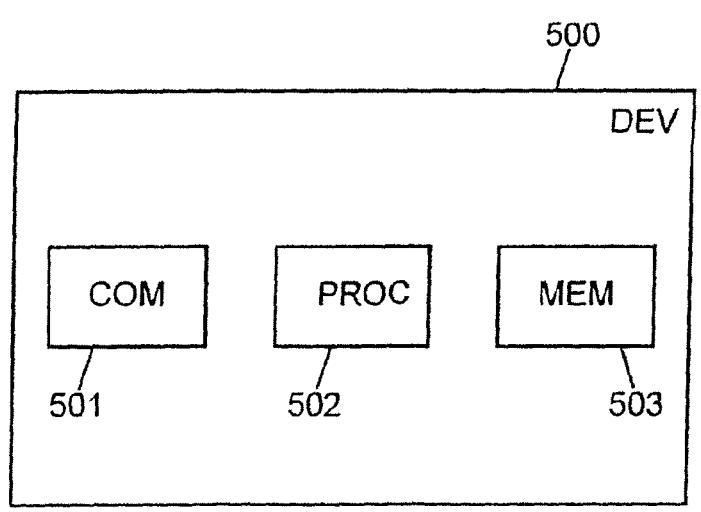
FIG. 5 is an illustration of an image processing device according to according to some embodiments of the invention.

FIG. 5 illustrates an image processing device 500 according to embodiments.

The image processing device comprises a communication unit 501 for receiving image data to be assembled in a panoramic image. The image processing device also comprises a control unit 502 for implementing a method according to embodiments of the invention. The control unit may comprise a circuit configured for implementing a method according to embodiments. The device comprises a memory unit 503. The memory unit may comprise several types of memory. For example, the memory unit may comprise a memory for storing processing data. The memory unit may also comprise a memory for storing a computer program according to embodiments of the invention.

The image processing device may be comprised in an image capturing device, such as a camera or a mobile telephone.

Embodiments of the present invention can be embedded in a computer program product, which comprises all the features enabling the implementation of the methods described herein, and which—when loaded in an information processing system—is able to carry out these methods. Computer program means or computer program in the present context mean any expression, in any language, code or notation, of a set of instructions intended to cause a system having an information processing capability to perform a particular function either directly or after a conversion to another language. Such a computer program can be designed based on the flowchart of FIG. 4 and the present description. The computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage.

Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

A person skilled in the art will readily appreciate that various parameters disclosed in the description may be modified and that various embodiments disclosed may be combined without departing from the scope of the invention.

The invention claimed is:

1. A method of forming a panoramic image by assembling images according to at least two non-parallel directions, the method being performed by an image processing device, and the method comprising the following steps of:
    storing first coordinates defining in a two dimensional space, edges of a current panoramic image,
    superimposing a current image on said current panoramic image for completing the current panoramic image, the current image thus having a first area which is not common with the current panoramic area,
    storing second coordinates defining in the two dimensional space, edges of the current image superimposed on the current panoramic image,
    deciding whether the first area should be added to the current panoramic image, based on the first and second stored coordinates, and
    adding, at least partially, the first area of the current image in the current panoramic image, if it has been decided to add the first area.

2. A method according to claim 1, wherein the steps are iterated for several images.

3. A method according to claim 1, wherein the current image has a second area common with the current panoramic image, the method further comprising the following steps, when it has been decided to add the first area:
    defining a third area in the current image, said third area being included in the second area in a vicinity of the first area and extending along a line of separation of the first and second areas, and
    performing a blending of pixels of the current panoramic image comprised in an area of the current panoramic image on which the third area is superimposed with pixels of the current image comprised in the third area.

4. A method according to claim 1, wherein the step of storing the first coordinates comprises defining:
    a first vector that stores for each abscissa of the current panoramic image the greatest ordinate of the current panoramic image at the said abscissa,
    a second vector that stores for each abscissa of the current panoramic image the lowest ordinate of the current panoramic image at the said abscissa,
    a third vector that stores for each ordinate of the current panoramic image the greatest abscissa of the current panoramic image at the said ordinate, and
    a fourth vector that stores for each ordinate of the current panoramic image the lowest abscissa of the current panoramic image at the said ordinate.

5. A method according to claim 4, further comprising updating at least one of the vectors after the first area has been added to the current panoramic image.

6. A method according to claim 1, wherein the step of storing the second coordinates comprises storing:
    for at least one abscissa of the current image, the lowest and the greatest ordinates of the current image at the said abscissa, and
    for at least one ordinate of the current image, the lowest and the greatest abscissas of the current image at the said ordinate.

7. A method according to claim 1, wherein the decision step comprises checking the following conditions:
    whether there exists at least one ordinate of the current panoramic image for which the sum of the lowest abscissa of the current image and a first margin value is inferior to the lowest abscissa of the current panoramic image at the said ordinate,
    whether there exists at least one ordinate of the current panoramic image for which the sum of the greatest abscissa of the current panoramic image at the said ordinate and the first margin value is inferior to the greatest abscissa of the current image,
    whether there exists at least one abscissa of the current panoramic image for which the sum of a second margin value and the lowest ordinate of the current image is inferior to the lowest ordinate of the current panoramic image at the said abscissa, and
    whether there exists at least one abscissa of the current panoramic image for which the sum of the second margin value and the greatest ordinate of the current panoramic image at the said abscissa is inferior to the greatest ordinate of the current image,
    and wherein it is decided to add the first area to the current panoramic image if at least one of the said conditions is fulfilled.

8. A method according to claim 7, wherein it is decided to add the first area to the current panoramic image if at least two of the said conditions are fulfilled.

9. A method according to claim 1, wherein the current panoramic image corresponds to a set of previously assembled images.

10. A method according to claim 1, wherein the current panoramic image has a convex shape.

11. A non-transitory computer program product comprising a computer readable medium, having thereon a computer program comprising program instructions adapted to, when loaded and run on computer means of an image processing device, cause the computer means to implement the steps of a method according to claim 1.

12. A circuit configured to form a panoramic image by assembling images according to at least two non-parallel directions by:

storing first coordinates defining in a two dimensional space, edges of a current panoramic image, superimposing a current image on said current panoramic image for completing the current panoramic image, the current image thus having a first area which is not common with the current panoramic area, storing second coordinates defining in the two dimensional space, edges of the current image superimposed on the current panoramic image, deciding whether the first area should be added to the current panoramic image, based on the first and second stored coordinates, and adding, at least partially, the first area of the current image in the current panoramic image, if it has been decided to add the first area.

13. A circuit according to claim 12, wherein the current image has a second area common with the current panoramic image, the circuit further being configured for:

defining a third area in the current image, said third area being included in the second area in a vicinity of the first area and extending along a line of separation of the first and second areas, and performing a blending of pixels of the current panoramic image comprised in an area of the current panoramic image on which the third area is superimposed with pixels of the current image comprised in the third area, when it has been decided to integrate the first area.

14. An image processing device comprising at least one memory and a control unit for forming a panoramic image by assembling images according to at least two non-parallel directions, the control unit comprising a circuit according to claim 12.

15. An image capturing device comprising an image capturing arrangement and the image processing device of claim 14.

16. An image capturing device according to claim 15, wherein the image capturing device comprises a camera.

17. An image capturing device according to claim 15, wherein the image capturing device comprises a mobile phone.

18. A method of forming a panoramic image by assembling images according to at least two non-parallel directions, the method being performed by an image processing device, and the method comprising the following steps of:

storing first coordinates defining in a two dimensional space, edges of a current panoramic image aggregated from multiple previous images, superimposing a current image on said current panoramic image for completing the current panoramic image, the current image thus having a first area which is not common with the current panoramic image and a second area common with the current panoramic image, storing second coordinates defining in the two dimensional space, edges of the current image superimposed on the current panoramic image, deciding whether the first area which is not common with the current panoramic image should be added to the current panoramic image, based on the first and second stored coordinates, adding, at least partially, the first area which is not common with the current panoramic image to the current panoramic image, if it has been decided to add the first area, defining a third area in the current image, said third area being included in the second area in a vicinity of the first area and extending along a line of separation of the first and second areas, if it has been decided to add the first area, and performing a blending of pixels of the current panoramic image comprised in an area of the current panoramic image on which the third area is superimposed with the pixels of the current image comprised in the third area.

\* \* \* \* \*